United States Patent [19]

Kawabata

[11] Patent Number: 4,938,499

[45] Date of Patent: Jul. 3, 1990

[54] ACTIVELY CONTROLLED AUTOMOTIVE SUSPENSION SYSTEM WITH ENGINE DRIVING CONDITION DEPENDENT VEHICULAR ATTITUDE CONTROL

[75] Inventor: Kazunobu Kawabata, Kanagawa, Japan

[73] Assignee: Nissan Motor Company, Limited, Yokohama, Japan

[21] Appl. No.: 244,008

[22] Filed: Sep. 14, 1988

[30] Foreign Application Priority Data

Sep. 17, 1987 [JP] Japan .................... 62-232890

[51] Int. Cl.⁵ .............................. B60G 11/26
[52] U.S. Cl. .................... 280/707; 364/424.01
[58] Field of Search ............... 280/707, DIG. 1; 364/424.01, 424.05, 426.01

[56] References Cited

U.S. PATENT DOCUMENTS 4,602,805  7/1986  Tanaka et al. .................. 280/707
4,700,303  10/1987 Tokuyama et al. ............... 280/707

FOREIGN PATENT DOCUMENTS

37509  2/1986  Japan .................... 280/707
194918  8/1987  Japan .................... 280/707

Primary Examiner—Charles A. Marmor
Assistant Examiner—Eric Culbreth
Attorney, Agent, or Firm—Foley & Lardner, Schwartz, Jeffery, Schwaab, Mack, Blumenthal & Evans

[57] ABSTRACT

An actively controlled suspension system monitors acceleration exerted on a vehicular body for producing a vehicular attitude change indicative suspension control parameter. Acceleration dependent suspension control is performed based on the vehicular attitude change indicative suspension control parameter for suppressing vehicular body attitude change. The suspension control system further monitors engine driving condition to detect unstable engine driving condition. The engine driving condition detector disables the acceleration dependent suspension control when the unstable condition of the engine is detected. Disabling of the acceleration dependent suspension control while the unstable engine driving condition is maintained, avoids influence of the vehicular body vibration caused by engine vibration which is caused by fluctuation of engine outputs in unstable condition.

14 Claims, 6 Drawing Sheets

ACTIVELY CONTROLLED AUTOMOTIVE SUSPENSION SYSTEM WITH ENGINE DRIVING CONDITION DEPENDENT VEHICULAR ATTITUDE CONTROL

BACKGROUND OF THE INVENTION

1. Field of the Invention

The present invention relates generally to an actively controlled suspension system for an automotive vehicle for controlling suspension characteristics for achieving riding comfort and/or vehicular driving stability depending upon the vehicle driving condition. More specifically, the invention relates to an actively controlled automotive suspension system which can improve suspension control characteristics upon starting-up of an automotive engine.

2. Description of the Background Art

The U.S. Pat. No. 4,702,490, issued on Oct. 27, 1987, to Hirotsugu YAMAGUCHI et al., and assigned to the common assignee to the present invention, discloses an actively or positively controlled automotive suspension system which includes a hydraulic cylinder for generating a variable damping force against relative motion of a vehicular suspension member and a vehicle body in bounding and rebounding directions for adjusting suspension characteristics and adjusting vehicle body attitude.

Similar type actively controlled suspension systems have been disclosed in the co-pending U.S. patent application Ser. No. 060,911, filed on June 12, 1987, and assigned to the common assignee of the present invention, and, European Patent First Publications Nos. 02 49 246 and 02 49 209 respectively corresponding to co-pending U.S. patent applications Ser. Nos. 061,368 (filed on June 15, 1987) and 059,888, filed on June 9, 1987, both of which have been assigned to the common assignee to the present invention. These three inventions include features of anti-rolling and/or anti-pitching suspension control for adjusting damping characteristics at respective vehicular wheel for suppressing vehicular rolling motion.

In order to perform anti rolling and/or anti-pitching suspension control, various suspension control parameters can be used for detecting the vehicular attitude change in rolling and/or pitching directions. Among various vehicular rolling and/or pitching representative parameters, an acceleration exerted on the vehicular body in lateral and/or longitudinal directions is one typical parameter to be used for anti-rolling and/or anti-pitching suspension control. In such case, vehicular body vibration caused by engine vibration which may be induced while the engine is driven in an unstable condition, will affect acceleration dependent attitude control. For example, when the engine starts or while the engine is in a cranking condition, substantial vibration is created. The engine vibration is transferred to the vehicular body and thus detected by an acceleration sensor which is provided for detecting lateral and/or longitudinal acceleration exerted on the vehicular body. This produces an erroneous detection of an attitude change of the vehicular body, despite the vehicle body not changing attitude. Mis-detection of a vehicular attitude change results in erroneous suspension control which causes an uncomfortable attitude change in the vehicular body.

SUMMARY OF THE INVENTION

Therefore, it is an object of the present invention to provide an actively controlled suspension system which improves suspension control characteristics while the engine is in unstable condition.

Another object of the invention is to provide an actively controlled suspension system which detects an unstable engine driving condition and terminates acceleration dependent suspension control.

In order to accomplish the aforementioned and other objects, an actively controlled suspension system, according to the present invention, employs means for monitoring acceleration exerted on a vehicular body for producing a vehicular attitude change indicative suspension control parameter. Acceleration dependent suspension control is performed based on the vehicular attitude change indicative suspension control parameter for suppressing vehicular body attitude change. The suspension control system further includes means for monitoring engine driving condition to detect an unstable engine driving condition. The engine driving condition detecting means disables the acceleration dependent suspension control when the unstable condition of the engine is detected.

Disabling of the acceleration dependent suspension control while the unstable engine driving condition is maintained, avoids influence of the vehicular body vibration caused by engine vibration which is caused by fluctuation of the engine output in an unstable condition.

According to one aspect of the invention, a control system for an automotive suspension system for controlling vehicular attitude, comprises:

a suspension system disposed between a vehicle body and a suspension member which rotatably supports a vehicular wheel, the suspension system having a variable pressure chamber filled with a working fluid of controlled pressure;

a pressure adjusting means, associated with the variable pressure chamber, for adjusting the pressure of the working fluid in the pressure chamber;

a first sensor means monitoring acceleration in vehicular attitude change to produce a sensor means signal indicative of the attitude change acceleration;

a second sensor means for monitoring engine driving condition to detect unstable condition of the engine; and a control unit receiving the sensor signal, deriving suspension control signal value on the basis of the sensor signal and modifying the suspension control signal for controlling operation of the pressure adjusting means in order to adjust suspension characteristics to suppress vehicular attitude change, the control unit being responsive to the second sensor means detecting unstable engine condition to fix the suspension control signal value to a preset value.

The second sensor means may comprise an engine speed sensor monitoring engine revolution speed for producing an engine speed data and means for comparing the engine speed data with a predetermined threshold for discriminating the engine driving condition between stable condition and unstable condition.

According to another aspect of the invention, a control system for an automotive suspension system for controlling vehicular attitude comprises:

a suspension system disposed between a vehicle body and a suspension member which rotatably supports a vehicular wheel, the suspension system having a variable pressure chamber filled with a working fluid of controlled pressure;

a pressure adjusting means, associated with the variable pressure chamber, for adjusting the pressure of the working fluid in the pressure chamber;

a first sensor means monitoring acceleration in vehicular attitude change to produce a first sensor signal indicative of the attitude change acceleration;

a second sensor means for monitoring engine revolution speed to produce a second sensor signal indicative of the monitored engine revolution speed; and a control unit receiving the sensor signal, deriving suspension control signal value on the basis of the sensor signal and modifying the suspension control signal for controlling operation of the pressure adjusting means in order to adjust suspension characteristics to suppress vehicular attitude change, the control unit detecting engine driving condition on the basis of the second sensor signal to set the suspension control signal value to a given value when a given unstable condition of the engine is detected.

Preferably, the control unit derives engine speed data on the basis of the second sensor signal value and compares the engine speed indicative data with a given threshold for making a judgement that the engine is in a stable condition when the engine speed data is maintained in a value greater than the threshold for a given period of time and otherwise makes a judgement that the engine is in an unstable condition.

The predetermined threshold is set at a value corresponding to a given unstable engine speed criterion. Furthermore, the suspension control system may be designed to perform anti-rolling suspension control for suppressing rolling motion of the vehicle, and the first sensor means is designed to monitor lateral acceleration for producing a lateral acceleration indicative sensor signal. In the alternative, the suspension control system may be designed to perform anti-pitching suspension control for suppressing pitching motion of the vehicle, and the first sensor means is designed to monitor longitudinal acceleration for producing a longitudinal acceleration indicative sensor signal.

In the preferred embodiment, the unstable engine speed criterion is set below a normal engine idling speed. In such a case, the control unit detects an unstable condition upon the engine starting up for temporarily disabling acceleration dependent suspension control.

DESCRIPTION OF THE PREFERRED EMBODIMENT

Figure 1:
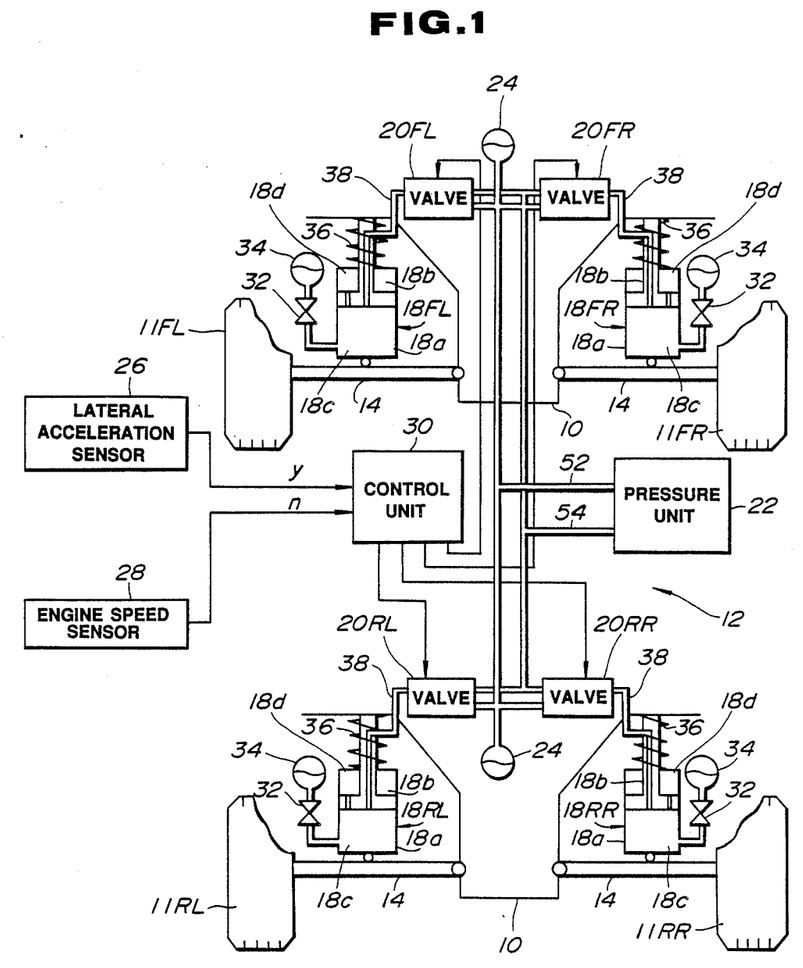
FIG. 1 is a schematic illustration of general construction of an actively controlled suspension system.

Referring now to the drawing, particularly to FIG. 1, a vehicle has four suspension systems for respectively suspending vehicle body 10 on front left, front-right, rear-left and rear-right road wheels 11FL, 11FR, 11RL and 11RR. Each of the front-left, front-right, rear-left and rear-right suspension systems comprises a suspension member 14, such as a suspension link, a suspension arm and so forth, and a suspension assembly which is interposed between the vehicle body 10 and the suspension member 14 and is generally referred to by a legend containing the reference numeral "18" followed by letters indicating position on the vehicle as follows: FL=front left, FR=front right, RR=rear right and RL=rear left. Each of the suspension assemblies 18FL, 18FR, 18RL and 18RR has a hydraulic cylinder 18a which serves as an actuator for generating damping force against bounding and rebounding motion between the vehicle body and the suspension member, and a coil spring 36.

It should be appreciated that, in the shown embodiment, the coil spring 36 is not necessary to damp dynamic kinetic energy and should resiliently support only static load to be exerted between the vehicle body and the suspension member. However, it should be, of course, possible to employ the coil spring which can be strong enough to damp part of dynamic kinetic energy in relative bounding and rebounding motion of the vehicle body and the suspension member.

The hydraulic cylinder 18a has a hollow cylinder housing filled with a viscous working fluid and a piston assembly 18b sealingly and thrustingly disposed within the internal space of the cylinder housing to divide the cylinder space into upper and lower fluid chambers 18c and 18d. A piston rod of the piston assembly 18b extends through one end of the cylinder housing. The other end of the cylinder housing is connected to one of the vehicle body 10 and the suspension member 14. On the other hand, the end of the piston rod is connected to the other of the vehicle body 10 and the suspension member 14.

The hydraulic cylinder 18a of the suspension assembly 18 is connected to a hydraulic pressure source unit 22 via a hydraulic circuit which includes pressure control valves 20FL, 20FR, 20RR, 20RL (generally referred to by the numeral 20). The pressure control valve 20 is electrically operable and connected to a microprocessor-based control unit 30. The hydraulic circuit includes a supply line 52 and a drain line 54. The pressure source unit generally comprises a pressure unit 22 and a reservoir tank 24. The pressure unit 22 is connected to the reservoir tank to suck the viscous working fluid in the reservoir tank to feed to the pressure control valve 20 via the supply line 52. On the other hand, the drain line 54 is connected to the reservoir to return the working fluid thereto.

As seen from FIG. 1, a pressure accumulator 34 is communicated with the upper fluid chamber 18d of the hydraulic cylinder via a pressure line. A throttle valve 32 is inserted between the upper fluid chamber 18*d* and the pressure accumulator 34. In the shown embodiment, the throttle valve 32 has a fixed throttling rate.

Figure 2:
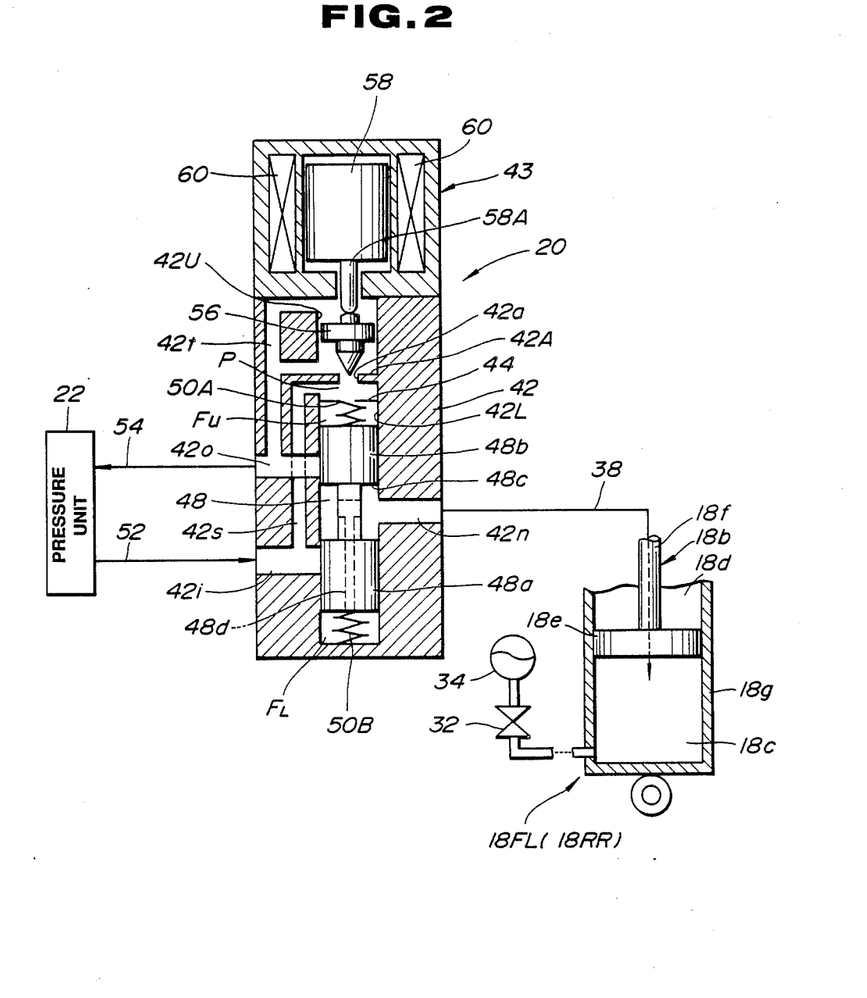
FIG. 2 is a sectional view of a pressure control valve assembly to be employed in the preferred embodiment of the actively controlled suspension system according to the invention.

FIG. 2 shows the preferred construction of the pressure control valve 20 to be employed in the suspension control system of FIG. 1.

The hydraulic cylinder 18*a* has the cylinder housing which is represented by the reference numeral "18*g*". The piston assembly 18*b* disposed within the cylinder housing 18*g* comprises a piston 18*e* and a piston rod 18*f*. In the shown embodiment, the cylinder housing 18*g* is connected to the suspension member 14 at the bottom thereof. On the other hand, the top end of the piston rod 18*f* is connected to the vehicle body 10. The piston assembly 18*b* is formed with a through opening communicated with the lower fluid chamber 18*c*. The through opening is connected to a pressure line 38 which is communicated with a communication port 42*n* of the pressure control valve 20.

The pressure control valve 20 comprises a valve housing 42 which housing a proportioning solenoid 43. The proportioning solenoid 43 is electrically connected to the control unit 30. The valve housing 42 defines a valve bore which is separated into a valve chamber 42L and a control chamber 42U by means of a partitioning member 42A. The partitioning member 42A is formed with a communication hole 42*a*. Above the communication hole 42*a* is defined the control chamber 42U. The valve chamber 42L and the control chamber 42U are aligned to each other across the communication hole 42*a*. Beneath the communication hole 42*a* and adjacent the top of the valve chamber 42L, a stationary throttling orifice defining member 44 is provided. The throttling orifice defining member 44 is formed with a fixed throttling rate of orifice. The throttling orifice defining member 44 defines with the partitioning member 42A a pilot chamber P.

A valve spool 48 is thrustingly or slidingly disposed within the valve chamber 42L. The valve spool 48 defines an upper feedback chamber FU between the top end thereof and the throttling orifice defining member 44. The valve spool 48 also defines a lower feedback chamber FL between the lower end thereof and the bottom of the valve chamber 42L. Offset springs 50A and 50B are disposed within the upper and lower feedback chambers FU and FL, which offset springs exerts spring force to the valve spool 48 for resiliently restricting movement of the latter. The valve chamber 42L is communicated with an inlet port 42*i*, a drain port 42*o* and the communication port 42*n* which are defined through the valve housing 42. The inlet port 42*i* is connected to the pressure unit 22 via a supply line 52. On the other hand, the drain port 42*o* is connected to the pressure unit 22 via the drain line 54.

The valve spool 48 is formed with an upper land 48*b* and a lower land 48*a*. The upper and lower lands 48*b* and 48*a* defines therebetween an annular pressure chamber 48*c*. The valve spool 48 is formed with a pilot path communicating the pressure chamber 48*c* with the lower feedback chamber FL.

A poppet valve member 56 is disposed within the control chamber 42U for thrusting or sliding movement therein. The poppet valve member 56 has a valve head opposing to the communication hole 42*a*. The poppet valve member 56 is operably associated with the proportioning solenoid 43 which comprises a plunger 58 which has a plunger rod 58A. The lower end of the plunger rod 58A of the plunger 58 opposes to the top end of the poppet valve 56. The poppet valve member 56 is driven by the plunger 58 to control the path area in the communication hole 42*a* according to the position of the plunger rod 58A. Therefore, the poppet valve member 56 adjusts the path area of the communication hole 42*a* and whereby to control fluid pressure to be introduced in the pilot chamber P. poppet valve member 56 separates the control chamber 42U into upper and lower control chambers. In order to control the position of the poppet valve 56 for adjusting the pilot pressure in the pilot chamber P, a solenoid coil 60 is provided for energizing the deenergizing to cause axial shift of the plunger rod 58A.

By adjusting the fluid pressure in the pilot chamber P, the pressure in the upper feedback chamber FU is adjusted to exert an axially driving force to the valve spool 48 to cause axial shift. By this, selective fluid communication between the inlet port 42*i*, the drain port 42*o* and the communication port 42*n* can be established to adjust the fluid pressure at the communication port 42*n*. Since the pressure at the communication port 42*n* is equal to the fluid pressure in the lower fluid chamber 18*c* of the pressure cylinder 18, the damping force created by the pressure cylinder can be adjusted. The inlet port 42*i* is also connected to the pilot chamber P via a fluid path 42*s*. On the other hand, the drain port 42*o* is connected to control chamber 42U via a fluid path 42*t*.

Figure 3:
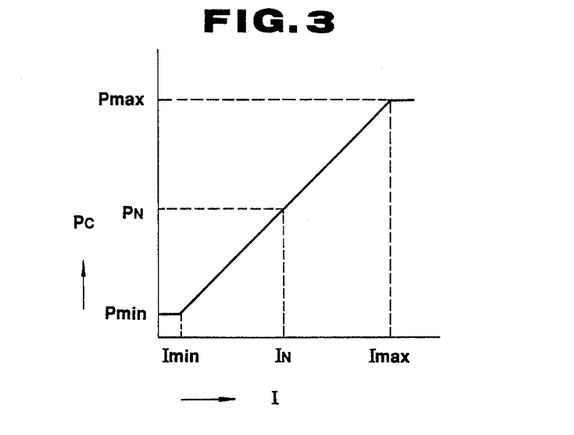
FIG. 3 is a graph showing variation of the fluid pressure in a hydraulic cylinder as controlled by the pressure control valve assembly of FIG. 2.

In order to control the pressure at the communication port 42*n*, a control current I is applied to the solenoid coil 60. The relationship between the control current I and the pressure at the communication port 42*n*, which pressure will be hereafter referred to as "control pressure Pc", is shown in FIG. 3. As will be seen from FIG. 3, the control pressure Pc is maintained at minimum value Pmin while the control current I is maintained at minimum value Imin. From the minimum pressure Pmin, the control pressure Pc linearly increases to the maximum pressure Pmax according to increasing of the control current I toward the maximum current Imax. At the normal condition, the control pressure Pc is to be maintained constant at a neutral pressure PN which corresponds to the control current IN.

Figure 4:
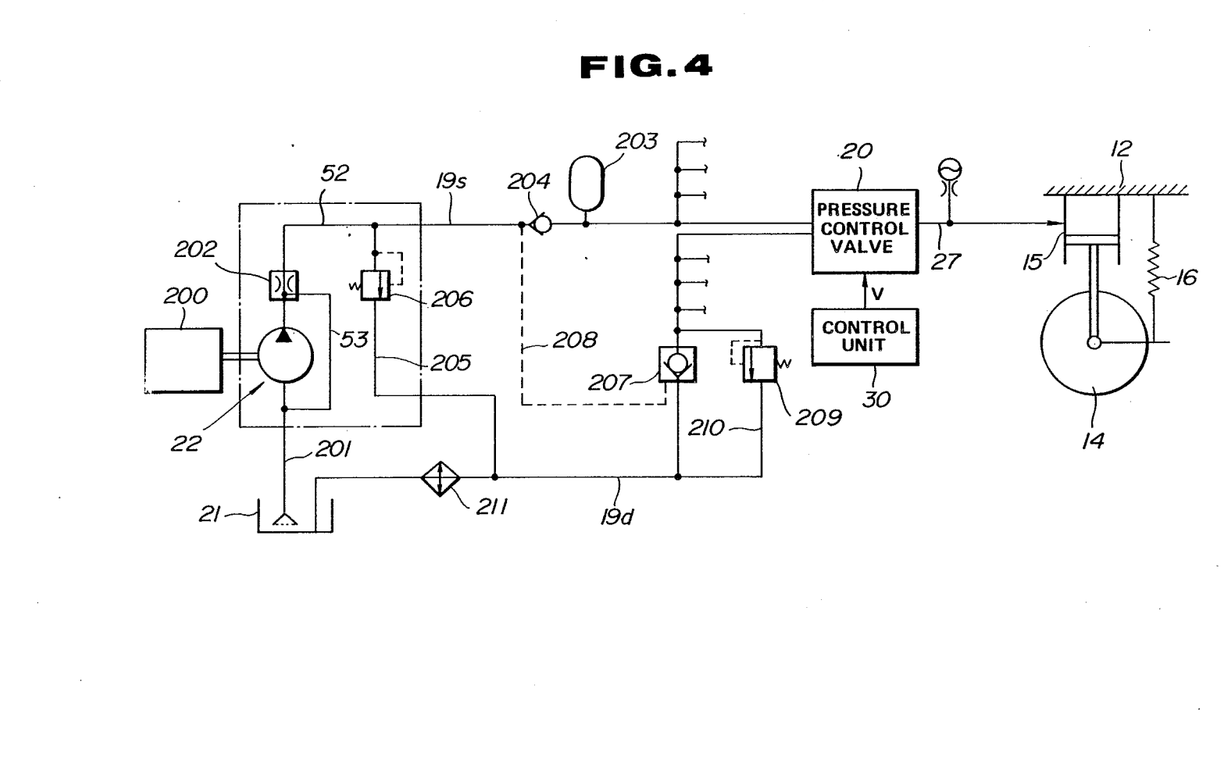
FIG. 4 is a schematic block diagram of a control unit in the preferred embodiment of suspension control system of FIG. 1.

FIG. 4 shows detailed circuit construction of the preferred embodiment of the hydraulic system to be employed in the suspension control system according to the invention. As set forth, the pressure source unit includes the pressure unit 22 which comprises a fluid pump, and is connected to the reservoir 21 via a suction pipe 201 which is driven by means of an automotive engine 200. The outlet of the pressure unit 22, through which the pressurized working fluid is fed, is connected to the inlet port 42*i* of the pressure control valve 18 via the supply line 52. A pressure regulating orifice 202 is disposed in the supply line 52 for suppressing pulsatile flow of the working fluid and thereby regulate the output pressure of the pressure unit 22 to be delivered to the pressure control valve 20. A feedback line 53 is connected to the upstream end of the pressure regulating orifice 202 at one end. The other end of the feedback line 53 is connected to the upstream end of the inlet of the pressure unit 22. Therefore, excessive fluid between the pressure unit 22 and the orifice 202 is fed back to the inlet side of the pressure unit.

A pressure accumulator 203 is also connected to the supply line 52 to receive therefrom the pressurized fluid for accumulating the pressure. An one-way check valve 204 is disposed in the supply line 52 at the position upstream of the junction between the pressure accumulator 203 and the supply line 52.

A pressure relief line 205 is also connected to the supply line 52 at the position intermediate between the pressure regulating orifice 202 and the one-way check valve 204, at one end. The other end of the pressure relief line 205 is connected to the drain line 54. A pressure relief valve 206 is disposed in the pressure relief line 205. The pressure relief valve 206 is responsive to the fluid pressure in the supply line 52 higher than a give value to drain part of the working fluid to the drain line for maintaining the pressure in the supply line 52 below the given pressure value.

On the other hand, a shut-off valve 207 is disposed in the drain line 54. The shut-off valve 207 is also connected to the supply line 52 at upstream of the one-way check valve 204 to receive therefrom the pressure in the supply line as a pilot pressure, via pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 54 may flow therethrough to the reservoir tank 21. On the other hand, the shut-off valve 207 is responsive to the pilot pressure drops below the given pressure level to be switched into shut-off position. At the shut-off position, the shut-off valve blocks fluid communication between the drain port 42o and the reservoir tank 21.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 54 upstream thereof, higher than a set pressure, e.g. 30 kgf/cm , in order to establish fluid communication between the upstream side and downstream side of the shut-off valve to allow the excessive pressure at the upstream side drain line 54 to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 54 for cooling the working fluid returning to the reservoir tank 21.

Pressurized fluid supply operation to be taken place by the pressure source unit as set forth above will be discussed herebelow.

While the automotive engine 200 is running, the fluid pump as the pressure unit 20 is driven. Therefore, the working fluid in the reservoir tank 21 is sucked via the suction pipe 201 and pressurized through the pressure unit 22. The pressurized working fluid is discharged from the outlet of the pressure unit 22 and fed to the pressure control valve 20 via the supply line 54 including the pressure regulating orifice 202 and the one-way check valve 204. When the pressure control valve 20 in a position of FIG. 2, the pressurized working fluid passes the pressure control valve and is introduced into the lower fluid chamber 18c of the hydraulic cylinder 18. On the other hand, when the pressure control valve 20 is shifted to block communication between the supply line 52 and the lower fluid chamber 18c, the line pressure in the supply line increases. When the line pressure in the supply line 52 becomes higher than a set pressure of the pressure relief valve 206 in the pressure relief line 205, the excessive pressure higher than the set pressure is fed to the drain line 54 via the pressure relief valve 206 and thus returned to the reservoir tank 21.

The fluid pressure in the supply line 52 is also fed to the shut-off valve 207 via the pilot line 208. As set forth, the shut-off valve 207 is placed at open position as long as the pilot pressure introduced through the pilot line 208 is held higher than or equal to the set pressure thereof. Therefore, fluid communication between the pressure control valve 20 and the reservoir tank 21 is maintained. At this position, the working fluid is thus returned to the reservoir tank 21 via the drain line 54 via the shut-off valve 207 and the oil cooler 211.

Since the shut off valve 207, even at the open position, serves as a resistance to the fluid flow. Therefore, the fluid pressure in the drain line 54 upstream of the shut-off valve 207 becomes excessively higher, i.e. higher than the off-set pressure $P_0$. Then, the pressure relief valve 209 becomes active to open for allowing the excessive pressure of the working fluid to flow through the by-pass line 210.

When the engine 200 stops, the pressure unit 22 cease operation. By stopping of the pressure unit 22, the working fluid pressure in the supply line 52 drops. According to drop of the pressure in the supply line 52, the pilot pressure to be exerted to the shut-off valve 207 via the pilot line 208 drops. When the pilot line 208 drops below or equal to the set pressure, the shut-off valve 207 is switched into shut-off position to block fluid communication therethrough. As a result, the fluid pressure in the drain line 54 upstream of the shut-off valve 207 becomes equal to the pressure in the lower fluid chamber 18c. Therefore, even when the working fluid leaks through a gap between the spool valve 48 and the inner periphery of the valve bore, it will not affect the fluid pressure in the lower fluid chamber 18c.

This is advantageous to maintain the suspension characteristics of the suspension systems irrespective of the engine driving condition.

Figure 5:
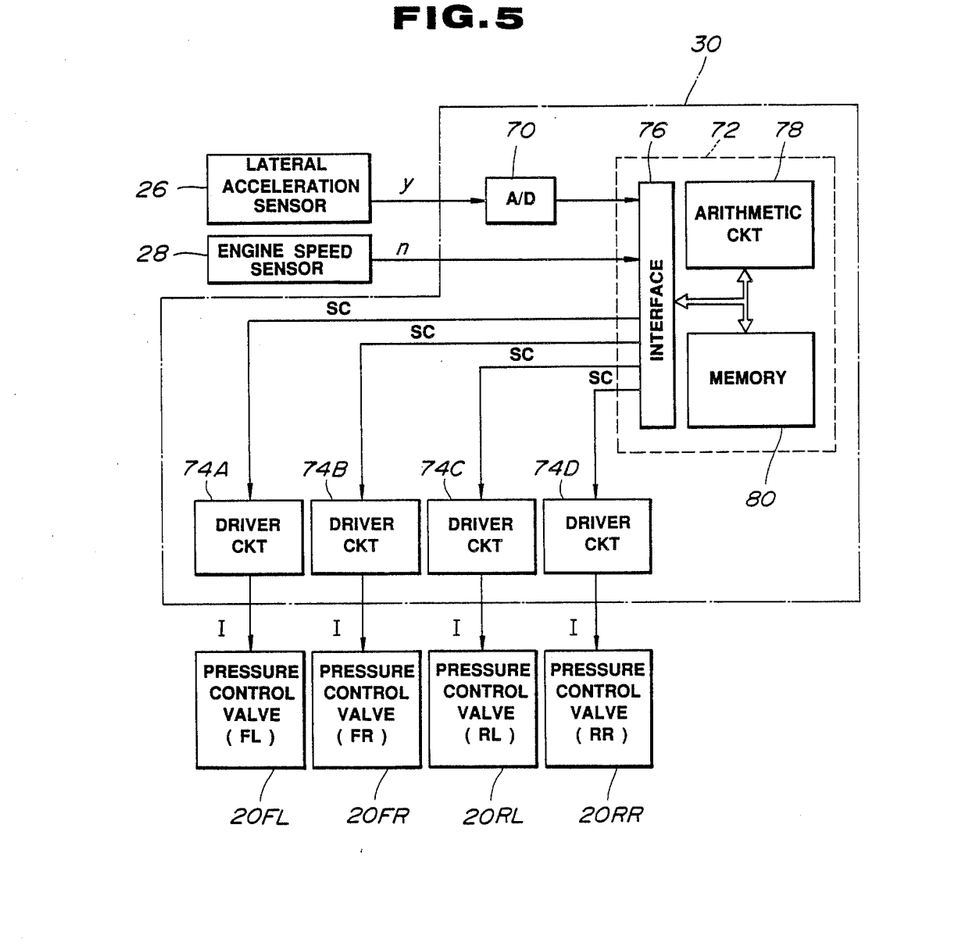
FIG. 5 is a schematic and diagramatic illustration of a hydraulic circuit to be employed for the preferred embodiment of the line pressure control of the invention.

In order to perform control for adjusting suspension characteristics depending upon the vehicle driving condition, the microprocessor-based control unit 30 is provided. The suspension control system including the control unit 30 is illustrated in FIG. 5. The control unit 30, illustrated in FIG. 5, includes a microprocessor 72 which comprises an arithmetic circuit 78, a memory 80 and input/output unit 76. A lateral acceleration sensor 26 is also provided for monitoring lateral acceleration to be exerted on the vehicle to produce a lateral acceleration indicative signal Gy. The lateral acceleration sensor 26 is oriented at the front side of the gravity center of the vehicular body. The lateral acceleration indicative signal Gy produced by the lateral acceleration sensor 26 is an analog signal and is input to an analog-to-digital (A/D) converter 70 which converts the analog form lateral acceleration indicative signal Gy into digital signal to input to the control unit 30 in a form of digital signal representative of the lateral acceleration. The control unit 30 is also connected to an engine speed sensor 28. In the shown embodiment, the engine speed sensor 28 is associated with a fuel injection system for the engine to detect fuel injection pulse to produce the engine speed indicative signal n.

Figure 6:
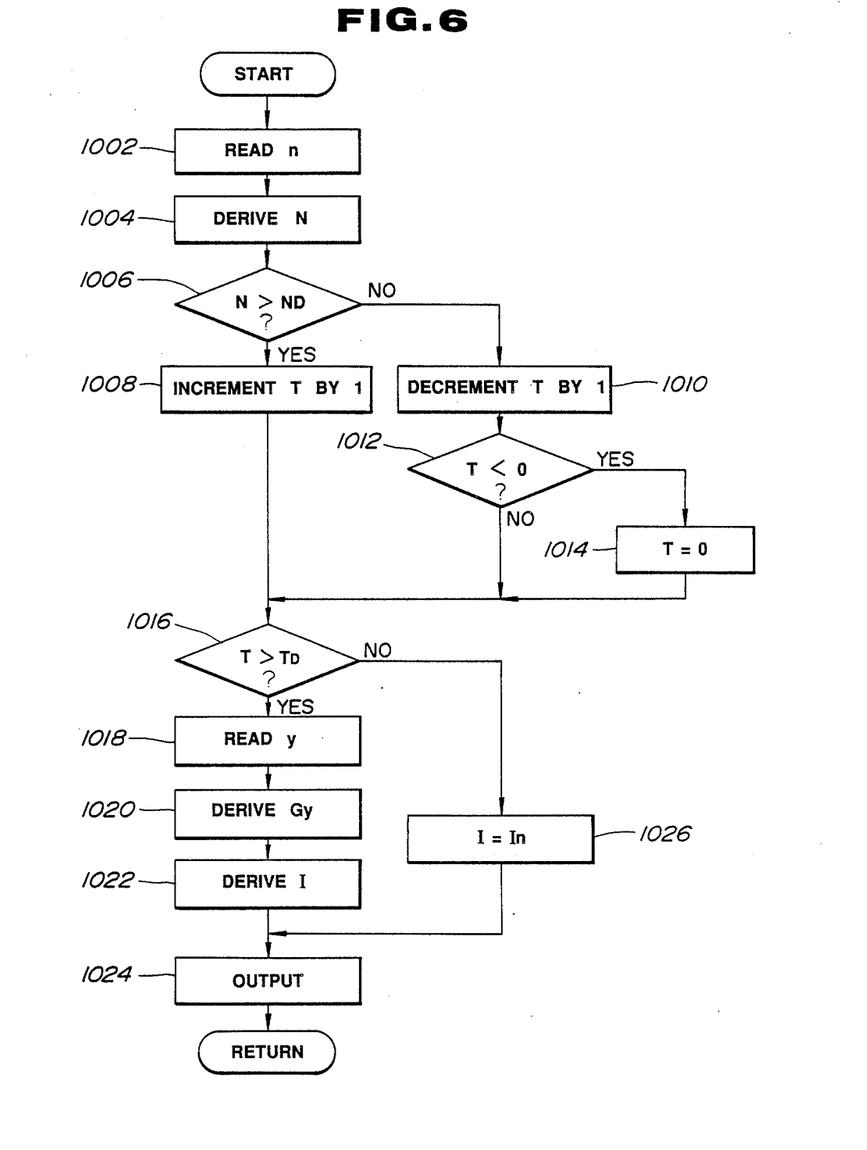
FIG. 6 is a flowchart of an engine driving condition dependent suspension control routine to be executed by the control unit of FIG. 4.

The operation to be performed by the suspension control system set forth above will be discussed herebelow with reference to FIG. 6 which illustrates the preferred process of lateral acceleration dependent anti-rolling suspension control according to the present invention.

The shown suspension control routine is triggered in response to turning ON of an ignition switch (not shown). As will be appreciated, the control unit 30 performs suspension control with respect to various suspension control parameters in anti-pitching control, anti-bouncing control, anti-squat control, anti-dive control, anti-rolling control and so forth. These controls are done by sub routine or interrupt routine governed by a main program which is executed as a background job. The routine of FIG. 6 is formulated as an interrupt program which is executed at every given timing, e.g. every 20 msec.

Immediately after starting execution, the engine speed indicative data n is read at a step 1002. At a step 1004, an engine speed data N is derived on the basis of the engine speed indicative data n read at the step 1002. For deriving the engine speed data N, the engine speed indicative data n which is in a form of pulse signal having a pulse frequency corresponding to the engine speed, is counted over a given period of time. The engine speed data N is then derived based on the counted value and the given period.

The engine speed data N is then compared with a predetermined engine speed threshold ND at a step 1006. The engine speed threshold ND is set at a value corresponding to a critical engine speed N between stable and unstable engine condition in engine idling condition. Practically, the engine speed threshold ND is set at about 500 rpm. Here, while the engine is in cranking condition, the engine speed fluctuates in a range of approximately 300 rpm to approximately 500 rpm. Therefore, by setting the engine speed threshold ND, the unstable engine driving condition which occurs upon starting-up of the engine can be detected.

When the engine speed data N is greater than the engine speed threshold ND as checked at the step 1006, judgement can be made that the engine is in stable condition. Therefore, a value of a timer T is incremented by one (1) at a step 1008. On the other hand, when the engine speed data N smaller than or equal to the engine speed threshold ND is detected at the step 1006, the timer value T is decremented by one (1) at a step 1010. Then, the decremented timer value T is checked whether it is smaller than zero (0) at a step 1012. When the timer value T as checked at the step 1012 is smaller than zero, the timer value T is reset to zero at a step 1014.

After the step 1008 or the step 1014, or when the timer value T as checked at the step 1012 is greater than or equal to zero, the timer value T is compared with a timer threshold TD, at a step 1016. The timer threshold TD is set at a value corresponding to a period of time sufficiently long for making judgement that the engine is stable when the engine speed is held higher than the critical engine speed for a period longer than the given period of time as represented by the timer reference. In the shown embodiment, the timer threshold TD is set at a value corresponding to 2 sec. When the timer value T is greater than the timer threshold ND, the lateral acceleration indicative data y is read at a step 1018. Based on the lateral acceleration data y, the lateral acceleration data Gy is derived at a step 1020. Practically, the lateral acceleration data Gy is set in a loop-up table to be looked up in terms of the lateral acceleration data y.

At a step 1022, the control current I is derived on the basis of the lateral acceleration data Gy. Practically, the control current I is derived by multiplying the lateral acceleration data Gy by a predetermined coefficient K. The control current I derived at the step 1022 is output as the suspension control signal to the proportion solenoid 43 at a step 1024.

On the other hand, when the timer value T as checked at the step 1016 is smaller than or equal to the timer threshold TD, the control current I is set at a predetermined fixed value In at a step 1026. Then, the suspension control signal having the control current In is output at the step 1024.

While the engine is driven in stable condition and vehicle travels in straight, the vehicle attitude is maintained constant. At this condition, the lateral acceleration is not exerted on the vehicle body. At this condition, the control current I is maintained at the neutral value IN. As long as the control current is maintained at neutral value IN, the fluid pressure at the communication port 42n is maintained at the neutral pressure PN. Therefore, the fluid pressure in the lower fluid chamber 18c is maintained at the neutral pressure PN to maintain relative distance between the vehicular body 10 and the suspension member 14 at a neutral value.

The hydraulic cylinder serves for absorbing relatively high frequency road shock by discharging pressurized fluid to the pressure accumulator 34 via the throttle valve 32 and introducing the pressurized fluid from the pressure accumulator 34. Since the throttle valve 32 is provided a fixed throttling rate, the damping force is created by restricting the fluid flow between the pressure accumulator 34 and the lower fluid chamber 18c.

When bounding motion occurs at the suspension member, the piston 18e of the hydraulic cylinder 18a shifts upwardly to cause decreasing of the fluid pressure in the lower fluid chamber 18c. This causes decreasing of the fluid pressure at the communication port 42n of the pressure control valve 22. As a result, the fluid pressure in the lower feedback chamber FL is decreased by the decreasing of the fluid pressure at the communication port 42n to destroy force balance between the upward force creased by the fluid pressure in the lower feedback chamber FL and the coil spring 50B and the upper feedback chamber FU and the coil spring 50A. This causes downward movement of the valve spool 48 against the spring force of the bias spring 50B. As a result, the inlet port 42i becomes communicated with the communication port 42n via the pressure chamber 48c. Therefore, pressurized fluid is introduced into the lower fluid chamber 18c to increase the fluid pressure. By this downward movement of the valve spool 48, the drain port 42o is blocked communication with the communication port 42n. Therefore, the fluid pressure in the lower fluid chamber 18c is increased to increase fluid pressure in the lower fluid chamber 18c of the hydraulic cylinder 18a. This compensate pressure drop in the lower fluid chamber 18c. Thus, the decreasing of the fluid pressure in the lower fluid chamber 18c can be successfully absorb bounding energy input from the suspension member will not be transmitted to the vehicle body.

When rebounding motion occurs at the suspension member, the piston 18e of the hydraulic cylinder 18a shifts downwardly to cause increasing of the fluid pressure in the lower chamber 18c. This causes increasing of the fluid pressure at the outlet port 42n of the pressure control valve 22. As a result, the fluid pressure in the pilot chamber P increases to increase the fluid pressure in the upper feedback chamber FU to destroy the balance between the upward bias of the bias spring 50B and the upward hydraulic force of the lower feedback chamber FL. This causes downward movement of the valve spool 48 against the spring force of the bias spring 50B. As a result, communication is established between the communication port 42n and the drain port 42o via the pressure chamber 48c. Therefore, the fluid pressure in the lower fluid chamber 18c is decreased by draining the pressure through the drain port 42o. By this increased fluid pressure in the fluid chamber 18c of the hydraulic cylinder 18a can be successfully absorbed so that the rebounding energy input from the suspension member will not be transmitted to the vehicle body.

Here, since no flow resisting element, such as orifice, throttling valve, is disposed between the fluid reservoir 21 and the drain port 18c, no damping force against the upward motion of the piston 18e in the hydraulic cylinder 18a will be produced in response to the bounding motion of the suspension member. Since the damping force exerted on the piston 18e may serves to allow transmission of the part of bounding energy to the vehicle body to cause rough ride feeling, the shown embodiment of the suspension system may provide satisfactorily high level riding comfort by completely absorbing the bounding and rebounding energy set forth above.

When the vehicular steering operation is performed, vehicular body causes rolling. Assuming that steering operation is performed for right-hand turn. The left-hand lateral acceleration is created. The lateral acceleration sensor 26 employed in the shown embodiment is designed to produce the lateral acceleration indicative signal y having a value greater than the neutral value, and on the other hand, produces smaller value than the neutral value in response to right-hand lateral acceleration which may be caused upon left-hand turning. The control unit 30, then produces suspension control signals for the proportioning solenoids 42 of the left-front and left-rear suspension systems to increase the fluid pressure. At the same time, the control unit 30 outputs the suspension control signal having smaller value than the neutral value for the proportioning solenoid 43 of the right-front and right rear suspension systems for decreasing the fluid pressure in the lower fluid chambers 18c. By this, lowering of the left side of the vehicular body which is otherwise caused by centrifugal force to be exerted on the vehicular body, can be successfully suppressed. On the other hand, reducing of the fluid pressure in the pressure cylinders of the right-front and right rear suspension systems will suppress expansion of the pressure cylinder due to reduction of the load to be exerted. Therefore, the vehicular body attitude can be maintained at stable condition even during cornering.

When the engine is in unstable condition, such as that in cranking, the acceleration dependent suspension control is disabled as set forth above. Since the engine driven in unstable condition may cause substantial vibration to be transmitted to the vehicular body through the engine mounting structure, mis-detection of the lateral acceleration may cause erroneous suspension control when the acceleration dependent control is not disabled. To this, the shown embodiment of the suspension control system is successful in avoiding influence of the engine vibration in suspension control.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, through the shown embodiment of the suspension control performs anti-rolling suspension control for suppressing vehicular rolling, the process of acceleration dependent suspension control substantially according to the process set forth above including disabling of acceleration dependent control in response to unstable condition of the engine, is applicable for anti-pitching suspension control, anti-bouncing suspension control and so forth.

The present invention is further applicable for any suspension control technologies which utilizing acceleration exerted on the vehicular body or creased by the vehicular body. For example, the present invention is applicable for the suspension control systems disclosed in the following co-pending U.S. patent applications, all of which have been commonly assigned to the assignee of the present invention.

Ser. No.   Filing Date
169,201   Mar. 16, 1988
176,246   Mar. 31, 1988
172,419   Mar. 24, 1988

The disclosure of the foregoing co-pending U.S patent applications are herein incorporated by reference for the sake of disclosure.

Furthermore, though the specific construction of pressure control valve assembly is employed in the shown embodiment of the suspension control system which is disclosed hereabove for fully disclosing one example of implementation of the present invention, the construction of the pressure control valve assembly is not specified to the foregoing construction. For example, FIG. 7 shows another embodiment of the pressure control valve assembly which can perform equivalent pressure control operation to that of FIG. 2.

Figure 7:
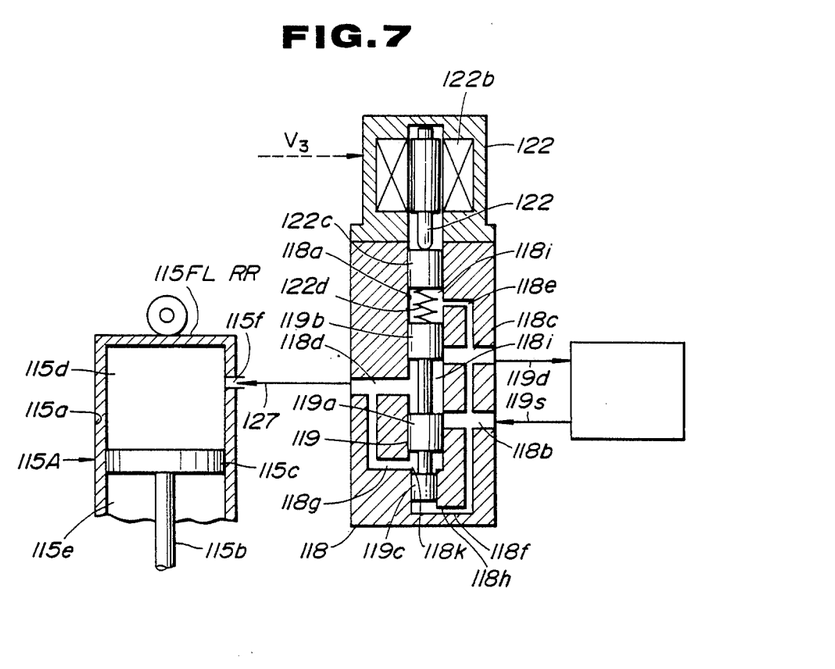
FIG. 7 is a sectional view of another embodiment of a pressure control valve assembly to be employed in the preferred embodiment of the actively controlled suspension system according to the invention.

FIG. 7 shows the detailed construction of the hydraulic cylinder 115A and the pressure control valve 22. As will be seen from FIG. 7, the hollow cylinder housing 115a is formed with a port 115f communicating the upper fluid chamber 15d to an outlet port 118d of the pressure control valve 22 via a communication line 127. Though FIG. 7 does not show clear construction, the lower fluid chamber 115e is defined as an enclosed space and is filled with the viscous working fluid. The pressure of the working fluid in the lower fluid chamber 115e at an initial position of the piston 115c serves as a reference pressure and per se serves as resistance for downward movement of the piston.

The pressure control valve 22 has a valve housing 118 having the aforementioned outlet port 118d, an inlet port 118b and a drain port 118c. Respective inlet port 118b, the drain port 118c and the outlet port 118d are connected to a valve bore 118a defined within the valve housing 118A. A valve spool 119 is disposed within the valve bore 118a for thrusting movement therein. The valve spool 119 has first, second and third lands 119a, 119b and 119c. As will be seen from FIG. 7, the third land 119o has smaller diameter than that of the first and second lands 119a and 119b. The third land 119c defines a fifth pressure control chamber 118h which is connected to the drain port 118c via a drain path 118f. An actuator piston 122c is also disposed within the valve bore 118a. The actuator piston 122c opposes the second land 119b in spaced apart relationship to define a second pressure control chamber 118i which is connected to the drain port 118c via a drain path 118e. An annular pressure chamber 118j is defined between the first and second lands 119a and 119b. The pressure chamber 118j is constantly communicated with the outlet port 118d and whereby communicated with the upper fluid chamber 115d. On the other hand, the pressure chamber 118j shifts according to shifting of the valve spool 119 to selectively communicate with the inlet port 118b and the drain port 118c. On the other hand, an pressure control chamber 118k is defined between the first and third lands 119a and 119c. The pressure control chamber 118k is in communication with the outlet port 118d via a pilot path 118g. A bias spring 122d is interposed between the actuator piston 122c and the valve spool 119. The actuator piston 122c contacts with an actuator rod 122a of an electrically operable actuator 122 which comprises an electromagnetic solenoid. The solenoid 122 comprises a proportioning solenoid.

In order to increase the supply pressure of the working fluid, the spool valve 119 is shifted to the position to increase path area at a throttle constituted at the inner end of the inlet port 118b by means of the land 119a of the spool valve 119. On the other hand, in order to decrease the supply pressure of the working fluid, the spool valve is shifted to the position to decrease the path area at the throttle of the inner end of the inlet port 118b and opens the drain port 118 which is normally blocked by means of the land 119b of the spool valve.

As seen from FIG. 7, the proportioning solenoid 122 comprises the actuator rod 122a and a solenoid coil 122b. The solenoid coil 122b is energized by suspension control signal from the control unit. In the shown embodiment of the pressure control valve, the working fluid pressure P at the outlet port 118d is variable according to the characteristics shown in FIG. 3. Namely, when the control value represented by the suspension control signal is zero, the pressure at the outlet port 118 becomes an initial pressure determined according to a predetermined offset pressure. When the suspension control signal value in positive value increases, the fluid pressure at the outlet port 118d increases with a predetermined proportioning rate. Namely, by increasing of the suspension control value, the actuator rod 122a is driven downwardly in FIG. 7 at a magnitude toward to position to achieve increasing of the fluid pressure with the predetermined proportioning rate. The fluid pressure at the outlet port 118d saturate at the output pressure of the pressure unit. On the other hand, when the suspension control signal value decreases, the pressure decreases to zero to by shifting of the actuator rod 122a.

The actuator rod 122a of the proportioning solenoid 122 is associated with the actuator piston 122c. Contact between the actuation rod 122a and the actuator piston 122c can be maintained by the resilient force of the bias spring 122d which normally biases the actuator piston toward the actuation rod. On the other hand, the spring force of the bias spring 122d is also exerted on the valve spool 119 to constantly bias the valve spool downwardly in FIG. 7. The valve spool 119 also receives upward hydraulic force from the pressure control chamber 118k. Therefore, the valve spool 119 is oriented at the position in the valve bore at the position where the downward bias of the bias spring 122d balances with the upward hydraulic force of the pressure control chamber 118k.

As will be seen herefrom, the shown construction of the pressure control valve performs the equivalent operation to that discussed with respect to the preferred embodiment.

As will be appreciated herefrom, the present invention fulfills all of the objects and advantages sought therefor.

What is claimed is:

1. A control system for an automotive suspension system for controlling vehicular attitude comprising:
   a suspension system disposed between a vehicle body and a suspension member which rotatably supports a vehicular wheel, said suspension system having a variable pressure chamber filled with a working fluid of controlled pressure;
   a pressure adjusting means, associated with said variable pressure chamber, for adjusting the pressure of said working fluid in said pressure chamber;
   a first sensor means monitoring acceleration in vehicular attitude change to produce a sensor means signal indicative of said attitude change acceleration;
   a second sensor means for monitoring engine driving condition to detect unstable condition of the engine, said second sensor means comprising an engine speed sensor monitoring engine revolution speed for producing engine speed data;
   means for comparing said engine speed data with a predetermined threshold for discriminating between a stable engine driving condition and an unstable engine driving condition; and
   a control unit receiving said sensor signal, deriving a suspension control signal value on the basis of said sensor signal for controlling operation of said pressure adjusting means in order to adjust suspension characteristics to suppress vehicular attitude change, said control unit being responsive to said comparing means detecting an unstable engine condition to fix said suspension control signal value to a preset value.

2. A suspension control system as set forth in claim 1, wherein said predetermined threshold is set at a value corresponding to a given unstable engine criterion.

3. A suspension control system as set forth in claim 2, wherein said second sensor means further comprises a timer means for measuring elapsed time while the engine speed data is maintained greater than said predetermined threshold to detect the engine stable condition.

4. A suspension control system as set forth in claim 3, wherein said unstable engine criterion is set below a normal engine idling speed.

5. A suspension control system as set forth in claim 4, wherein said second sensor means detects unstable condition upon engine starting up for temporarily disabling acceleration dependent suspension control.

6. A suspension control system as set forth in claim 1, which is designed to perform anti-rolling suspension control for suppressing rolling motion of the vehicle, and said first sensor means is designed to monitor lateral acceleration for producing lateral acceleration indicative sensor signal.

7. A suspension control system as set forth in claim 1, which is designed to perform anti-pitching suspension control for suppressing pitching motion of the vehicle, and said first sensor means is designed to monitor longitudinal acceleration for producing longitudinal acceleration indicative sensor signal.

8. A control system for an automotive suspension system for controlling vehicular attitude comprising:
   a suspension system disposed between a vehicle body and a suspension member which rotatably supports a vehicular wheel, said suspension system having a variable pressure chamber filled with a working fluid of controlled pressure;
   a pressure adjusting means, associated with said variable pressure chamber, for adjusting the pressure of said working fluid in said pressure chamber;
   a first sensor means monitoring acceleration in vehicular attitude change to produce a first sensor signal indicative of said attitude change acceleration;
   a second sensor means for monitoring engine revolution speed to produce a second sensor signal indicative of the monitored engine revolution speed; and
   a control unit receiving said sensor signal, deriving a suspension control signal value on the basis of said sensor signal and modifying said suspension control signal for controlling operation of said pressure adjusting means in order to adjust suspension characteristics to suppress vehicular attitude change, said control unit deriving engine speed data on the basis of said second sensor signal value and comparing said engine speed indicative data with a given threshold for making a judgement that the engine is in a stable condition when said engine speed data is maintained at a value greater than said threshold for a given period of time and otherwise making a judgement that the engine is in an unstable condition, and said control unit setting said suspension control signal value to a given value when a given unstable condition of the engine is detected.

9. A suspension control system as set forth in claim 8, wherein said predetermined threshold is set at a value corresponding to a given unstable engine speed criterion.

10. A suspension control system as set forth in claim 9, which is designed to perform anti-rolling suspension control for suppressing rolling motion of the vehicle, and said first sensor means is designed to monitor lateral acceleration for producing lateral acceleration indicative sensor signal.

11. A suspension control system as set forth in claim 9, which is designed to perform anti-pitching suspension control for suppressing pitching motion of the vehicle, and said first sensor means is designed to monitor longitudinal acceleration for producing longitudinal acceleration indicative sensor signal.

12. A suspension control system as set forth in claim 9, wherein said unstable engine speed criterion is set below a normal engine idling speed.

13. A suspension control system as set forth in claim 9, wherein said control unit detects unstable condition upon engine starting up for temporarily disabling acceleration dependent suspension control.

14. A control system for an automotive suspension system for controlling vehicular attitude comprising:
   a suspension system disposed between a vehicle body and a suspension member which rotatably supports a vehicular wheel, said suspension system having a variable pressure chamber filled with a working fluid of controlled pressure;
   a pressure adjusting means, associated with said variable pressure chamber, for adjusting the pressure of said working fluid in said pressure chamber;
   a first sensor means monitoring acceleration in vehicular attitude change to produce a sensor signal indicative of said attitude change acceleration;
   a second sensor means for monitoring a preselected engine driving parameter representative of engine revolution speed;
   a detector means receiving an output of said second sensor means and detecting an engine speed representative parameter value being out of a predetermined range of values for producing an unstable engine driving condition indicative detector signal; and
   a control unit receiving said sensor signal, deriving a suspension control signal value on the basis of said sensor signal for controlling operation of said pressure adjusting means in order to adjust suspension characteristics to suppress vehicular attitude change, said control unit being responsive to said unstable engine driving condition indicative detector signal for disabling derivation of said suspension control signal value on the basis of said sensor signal.

* * * * *